(12) United States Patent
Joseph

(10) Patent No.: US 9,692,111 B2
(45) Date of Patent: Jun. 27, 2017

(54) ANTENNA FOR UNATTENDED GROUND SENSOR

(71) Applicant: Digital Barriers Services Ltd., London (GB)

(72) Inventor: Bearpark Paul Joseph, London (GB)

(73) Assignee: Digital Barriers Services Ltd., London (GB)

( * ) Notice: Subject to any disclaimer, the term of this patent is extended or adjusted under 35 U.S.C. 154(b) by 0 days.

(21) Appl. No.: 14/432,801

(22) PCT Filed: Aug. 12, 2013

(86) PCT No.: PCT/GB2013/052149
§ 371 (c)(1),
(2) Date: Apr. 1, 2015

(87) PCT Pub. No.: WO2014/057239
PCT Pub. Date: Apr. 17, 2014

(65) Prior Publication Data
US 2015/0270604 A1 Sep. 24, 2015

(30) Foreign Application Priority Data
Oct. 10, 2012 (GB) .................................. 1218158.2

(51) Int. Cl.
*H01Q 1/36* (2006.01)
*H01Q 1/04* (2006.01)
(Continued)

(52) U.S. Cl.
CPC ................ *H01Q 1/36* (2013.01); *H01Q 1/04* (2013.01); *H01Q 1/22* (2013.01); *H01Q 1/42* (2013.01);
(Continued)

(58) Field of Classification Search
CPC .......... H01Q 1/04; H01Q 1/2233; H01Q 1/42; H01Q 9/0421
See application file for complete search history.

(56) References Cited

U.S. PATENT DOCUMENTS

| 6,218,991 B1 | 4/2001 | Sanad | |
| 6,218,995 B1 * | 4/2001 | Higgins | ................. G01D 4/002 340/870.02 |

(Continued)

FOREIGN PATENT DOCUMENTS

| EP | 1381111 A1 | 1/2004 |
| EP | 2458407 A1 | 5/2012 |

(Continued)

OTHER PUBLICATIONS

Kuga, et al., Circular patch antennas miniaturized by shorting posts, Electronics and Communications in Japan (Part I: Communications), Jun. 1996, pp. 51-58, vol. 79, Issue 6, Hoboken, NJ, US.

(Continued)

*Primary Examiner* — Jessica Han
*Assistant Examiner* — Daniel J Munoz

(57) ABSTRACT

An unattended ground sensor unit (30) is disclosed comprising an antenna (2) which is accommodated mainly in a head portion (5) of the unit. The antenna (2) comprises a base conductor (100) and a top conductor (102), both of which are circular plates arranged in a horizontal plane. An antenna rod (204) is electrically connected to the top conductor (102). A hole is provided in the base conductor (100) and the antenna rod (204) extends through the hole to be connected to antenna control circuitry on a printed circuit board (104) on the reverse side of the base conductor (100). An insulating ring (106) is provided around the antenna rod (204) where it extends through the base conductor (100) so that the antenna (rod 204) is electrically insulated from the base conductor (100). Two shorting pins (205) are provided (Continued)

between the top conductor (102) and the base conductor (100). The shorting pins (20) are provided on diametrically opposite sides of the antenna rod (204). A dielectric spacer (202) is provided having a keying cutout (112) that can be engaged to resist its rotation.

19 Claims, 8 Drawing Sheets

(51) Int. Cl.
*H01Q 1/22* (2006.01)
*H01Q 1/42* (2006.01)
*H01Q 9/04* (2006.01)
*H01Q 9/36* (2006.01)
*G01V 1/16* (2006.01)
*G08B 13/16* (2006.01)

(52) U.S. Cl.
CPC ............. *H01Q 9/0421* (2013.01); *H01Q 9/36* (2013.01); *G01V 1/16* (2013.01); *G01V 1/166* (2013.01); *G08B 13/1663* (2013.01)

(56) References Cited

U.S. PATENT DOCUMENTS

| | | | |
|---|---|---|---|
| 6,300,907 B1 | 10/2001 | Lazar et al. | |
| 6,788,264 B2* | 9/2004 | Du | H01Q 1/3275 343/700 MS |
| 7,498,989 B1* | 3/2009 | Volman | H01Q 1/287 343/700 MS |
| 8,138,968 B1 | 3/2012 | Butler | |
| 2002/0145568 A1 | 10/2002 | Winter | |
| 2004/0196200 A1* | 10/2004 | Sievenpiper | H01Q 1/325 343/770 |
| 2007/0247380 A1 | 10/2007 | Borleske et al. | |
| 2008/0074283 A1 | 3/2008 | Verkleeren et al. | |
| 2008/0137484 A1 | 6/2008 | Scott | |
| 2009/0167610 A1* | 7/2009 | Chen | H01Q 9/0421 343/700 MS |
| 2011/0181476 A1 | 7/2011 | Raappana et al. | |

FOREIGN PATENT DOCUMENTS

| | | |
|---|---|---|
| JP | 05-199032 A | 8/1993 |
| JP | 2007-274317 A | 10/2007 |
| WO | 2007/005138 A2 | 1/2007 |

OTHER PUBLICATIONS

Oh, et al., A Low-Profile Omnidirectional Planar Antenna with Vertical Polarization Employing Two In-Phase Elements, General Assembly and Scientific Symposium, 2011 XXXth URSI, IEEE, Aug. 2011, pp. 1-4, Istanbul, Turkey.

Oh, et al., Low Profile, Miniaturized, Inductively Coupled Capacitively Loaded Monopole Antenna, IEEE Transactions on Antennas and Propagation, Dec. 2011, pp. 1206-1213, vol. 60, Issue 3, IEEE Antennas and Propagation Society, New York City, New York, US.

International Search Report and Written Opinion for PCT/GB2013/052149, with an international filing date of Aug. 12, 2013, 14 pages, mailed on Oct. 9, 2013, from the European Patent Office, Munich, Germany.

Search Report for GB1218158.2, with a filing date of Oct. 10, 2012, 2 pages, Feb. 4, 2013, from the Intellectual Property Office, United Kingdom.

* cited by examiner

ANTENNA FOR UNATTENDED GROUND SENSOR

CROSS-REFERENCE TO RELATED APPLICATIONS

The present application claims the benefit of PCT/GB2013/052149 filed Aug. 12, 2013 and GB 1218158.2 filed Oct. 10, 2012.

This invention relates to an antenna configured to be installed in an unattended ground sensor.

Unattended ground sensor units are used as part of security systems for infrastructure and personnel protection. Typically a number of unattended ground sensor units are provided around the perimeter of a site to be protected or along another boundary. Each unattended ground sensor unit comprises at least one sensor for sensing a physical phenomenon in the region of the unit and often transmission means for transmitting signals away from the unit in dependence on the output of the sensor. Thus, for example, the sensor unit may include a seismic sensor for detecting vibrations in the ground which are indicative of a passing person, vehicle or other object. Similarly the sensor unit may include acoustic sensors, magnetometers, heat and light sensors and so on, each for a similar purpose of detecting the presence of a person or object or movement of a person or object in the region of the unit.

Typically unattended ground sensors are connected together in a network and, for example, connected to a central control unit where the output of each of the sensor units can be monitored and determinations made regarding the presence or movement of people and/or objects in or around the site which is to be monitored.

Unattended ground sensors typically have a whip antenna to allow them to communicate with one another and/or a central control unit. Whip antennas have been used because they are a simple design and can provide an omnidirectional radiation pattern. However, the present inventor has recognised that whip antennas may have certain drawbacks for unattended ground sensors. Firstly, whip antennas generally extend vertically from a sensor which means that they can be difficult to disguise or camouflage. Secondly, the whip antennas and/or external RF connector can be damaged, especially in the type of hazardous environment where unattended ground sensors may be deployed. Thirdly, whip antennas can be affected by wind, causing small movements of the ground sensor; these movements can be misinterpreted as a seismic event and may be the cause of false alarms/detections.

It would be desirable to provide an antenna for an unattended ground sensor unit which is more covert, insofar it is relatively unobtrusive once installed, but yet is robust and easy to deploy. The present invention is aimed at providing unattended ground sensor units which address at least some of these issues.

According to the present invention there is provided an antenna configured to be assembled in an unattended ground sensor, the antenna comprising: a first conductor having a first planar surface; a second conductor having a second planar surface, wherein the second planar surface is substantially parallel to the first planar surface; an antenna conducting pin connected to the first conductor and extending between the first and second conductors and spacing them apart; and one or more shorting pins connected to the first conductor and extending between the first and second conductors, wherein the one of more shorting pins are electrically connected to both the first and second conductors.

In this way, a top-loaded antenna can be provided. This is advantageous because a top-loaded antenna is generally shorter than a whip antenna for a comparable application with a similar efficiency. This allows an unattended ground sensor that is more covert and can be more easily camouflaged. A top-loaded antenna can also be accommodated internally within an unattended ground sensor which means that the antenna is less vulnerable to deliberate or accidental damage. For example, a vehicle could be driven over an unattended ground sensor including such an antenna without causing damage. A top-loaded antenna is also less likely to be affected by wind, especially if the antenna can be located entirely within the ground sensor housing.

The antenna conducting pin is preferably arranged so that electrical currents can be directed through it to the first conductor. The antenna conducting pin is preferably insulated from the second conductor, which is normally at a ground potential. It has been determined by experiment that the inclusion of one or more shorting pins can increase the antenna efficiency. Specifically, the shorting pins may help in matching the antenna to the driving circuit. Improved antenna efficiency may be determined by measuring the voltage standing wave ratio (VSWR).

The antenna conducting pin may extend through a bore in the second conductor, and an electrical insulator may be provided between the second conductor and the antenna conducting pin.

The antenna may comprise at least two shorting pins arranged on opposite sides of the antenna conducting pin. For example, the shorting pins may be diametrically opposite one another, either side of a tubular antenna conducting pin. This arrangement has been found to improve antenna efficiency for a given antenna volume.

The one or more shorting pins may be made of a different material to the antenna conducting pin. In one embodiment the shorting pins are made of the same material as the first and second conducting surfaces. The shorting pins may be made of brass and the antenna conducting pin may be made of copper. It has been determined by experiment that this configuration can improve antenna efficiency for a given antenna volume.

Preferably there is an antenna controller electrically connected to the conducting pin so that electrical currents can be directed through the conducting pin to the first conductor. The antenna controller may be provided in a circuit board and the circuit board may be attached to the second conductor and arranged on the opposite side to the first conductor. By attaching the circuit board to the underside of the second conductor it is possible to create a robust and compact antenna arrangement.

The antenna may include a solid dielectric spacer arranged in the space between the first and second planar surfaces. Preferably the solid dielectric has a higher dielectric constant than air. This can allow the separation of the first and second planar surfaces to be reduced further, which is advantageous as it can reduce the physical size of the antenna. The solid dielectric may also improve the robustness of the antenna by resisting any mechanical forces that could otherwise bend or warp the first and second planar surfaces. The solid dielectric may be a material such as Polytetrafluoroethylene (PTFE).

The solid dielectric preferably comprises a bore through which the conducting pin can extend. This arrangement can facilitate the assembly process so that the solid dielectric can be fitted onto the conducting pin.

The solid dielectric may include a keying feature that can be engaged to resist its rotation. This may be especially important when there is more than one conducting pin because the solid dielectric would not be able to rotate without breaking the pins. By providing the keying feature the solid dielectric can be rotationally locked to prevent any damage to the conducting pins.

The antenna may include a clamp for engaging the solid dielectric. Preferably the clamp can resist any movement of the solid dielectric in a vertical direction (i.e. in a direction that is substantially perpendicular to the first and second planar surfaces). The clamp may also be arranged to lock together all of the components of the antenna. In one arrangement the clamp may be built into the cap of an unattended ground sensor.

The solid dielectric may comprise a flange that can be engaged by the clamp. The clamp may also include a keying feature that can engage with the keying feature on the solid dielectric. Thus, the clamp can prevent vertical and rotational movement of the solid dielectric. It can be important to prevent the solid dielectric from rotating to prevent stress on the shorting pins which can be soldered to the first and second conductors.

Preferably the frequency of operation is in the range of 800-1000 MHz.

Preferably still the antenna is designed to operate in the range of 825-950 MHz. The antenna may be used at different frequencies in different regions of the world.

In certain arrangements the frequency of operation could be below 825 MHz. As the frequency reduces the size of the components in the antenna may need to increase in order to achieve the same efficiency. In a mobile/portable device this may mean that a clamp arrangement needs to secure a higher mass.

The transmission range of the antenna may be designed to be at least twice the detection range. Thus, if two ground sensors are separated by the transmission range then any seismic activity between the sensors can be detected by at least one of them.

According to another aspect of the invention there is provided an unattended ground sensor comprising a housing for accommodating the antenna as described above. The unattended ground sensor is preferably arranged to be affixed to the ground so that any seismic vibrations can be detected. By enclosing the antenna within the housing the antenna can be protected. This can improve the reliability of the unattended ground sensor in comparison to a sensor with an external whip antenna. It may also be helpful in camouflaging the unattended ground sensor.

Preferably the unattended ground sensor further comprises at least one sensor for sensing a physical phenomenon in the region of the unit and the antenna is arranged to transmit information regarding the sensed physical phenomenon. The unattended ground sensor unit may comprise a memory for storing data in dependence on the output of the sensor. The sensor unit may comprise a head portion and body portion with a threaded exterior surface. The head portion may comprise engagement portions for engaging with a tool for rotatingly driving the sensor unit during installation in the ground. Preferably the sensor is a seismic sensor. The separation between the cap and the first conductor can be optimised to minimise antenna detuning.

According to another aspect of the invention there is provided a method of assembling an unattended ground sensor comprising the steps of: establishing electrical connections between an antenna controller and an antenna, wherein the antenna comprises a first conductor having a first planar surface, a second conductor having a second planar surface, wherein the second planar surface is substantially parallel to the first planar surface, an antenna conducting pin connected to the first conductor and extending between the first and second conductors and spacing them apart, and one or more shorting pins connected to the first conductor and extending between the first and second conductors, wherein the one of more shorting pins are electrically connected to both the first and second conductors; fitting the antenna controller and the antenna within a housing of the unattended ground sensor; and fitting a cap to the housing so that the antenna is enclosed.

According to yet another aspect of the invention there is provided an antenna comprising: a first conductor having a first planar surface; a second conductor having a second planar surface, wherein the second planar surface is substantially parallel to the first planar surface; a conducting pin connected to the first conductor and extending between the first and second conductors; a solid dielectric spacer arranged in the space between the first and second planar surfaces; and a clamp for engaging the solid dielectric, wherein the solid dielectric includes a keying feature that can be engaged to resist its rotation.

The solid dielectric can allow a top-loaded antenna to be produced with a reduced size for a given volume and efficiency. The solid dielectric can minimise antenna detuning, and it can also improve the robustness of the antenna by resisting any mechanical forces that could otherwise bend or warp the first and second planar surfaces. The clamp can be provided to resist any movement of the solid dielectric in a vertical direction (i.e. in a direction that is substantially perpendicular to the first and second planar surfaces). The clamp may also be arranged to lock together all of the components of the antenna. For example, the clamp may lock the solid dielectric to one of the conductors. In one arrangement the solid dielectric may be provided with a flange and the clamp may be provided to engage with the flange. Once installed the clamp may lock the solid dielectric to a housing structure. The second conductor may also be clamped to the housing structure by the clamp.

Embodiments of the present invention will now be described, by way of example only, with reference to the accompanying drawings in which.

Figure 1:
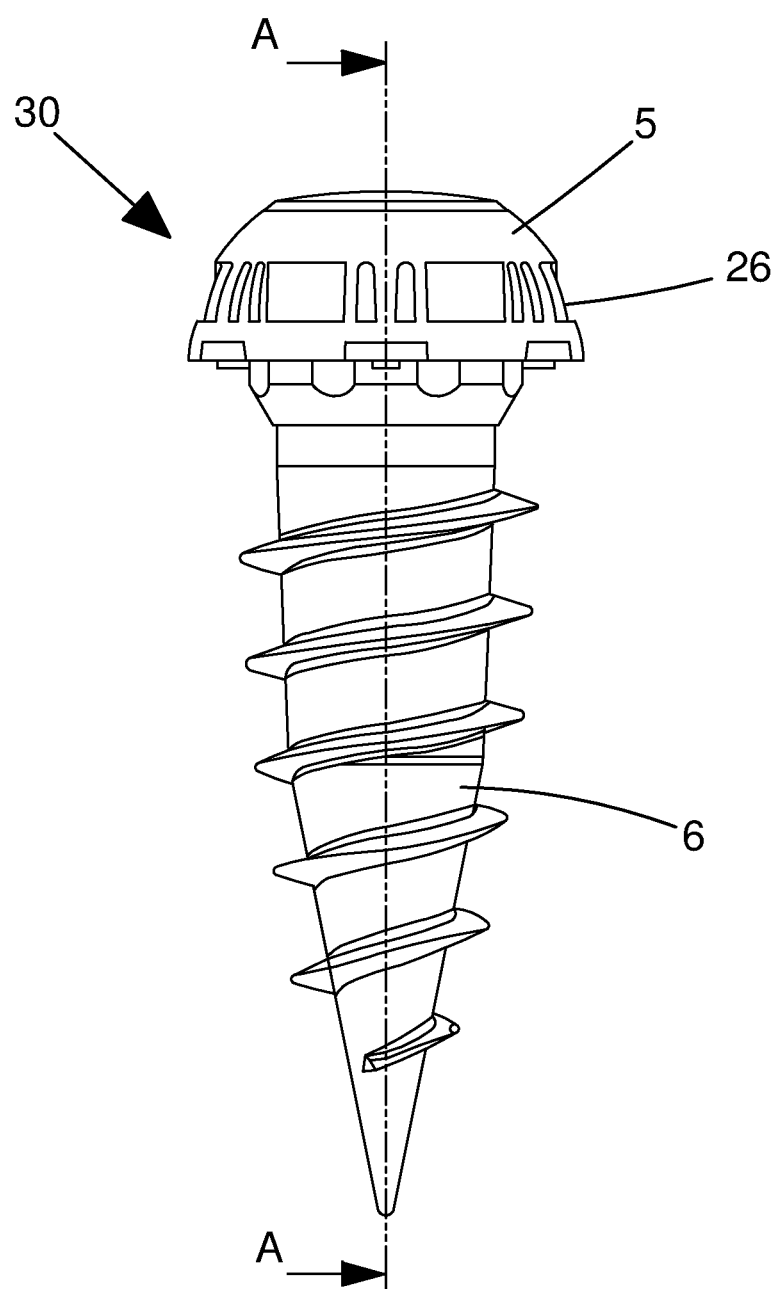
FIG. 1 is a schematic side view of an unattended ground sensor unit in an embodiment of the invention.
Figure 2:
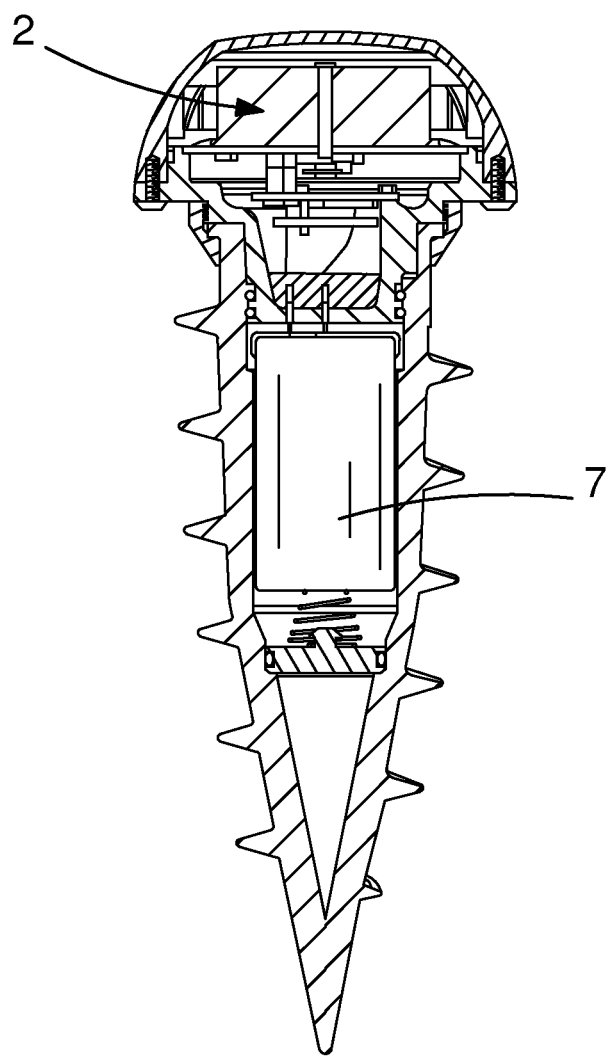
FIG. 2 is a section on line A-A of the unattended ground sensor unit shown in FIG. 1.
Figure 3:
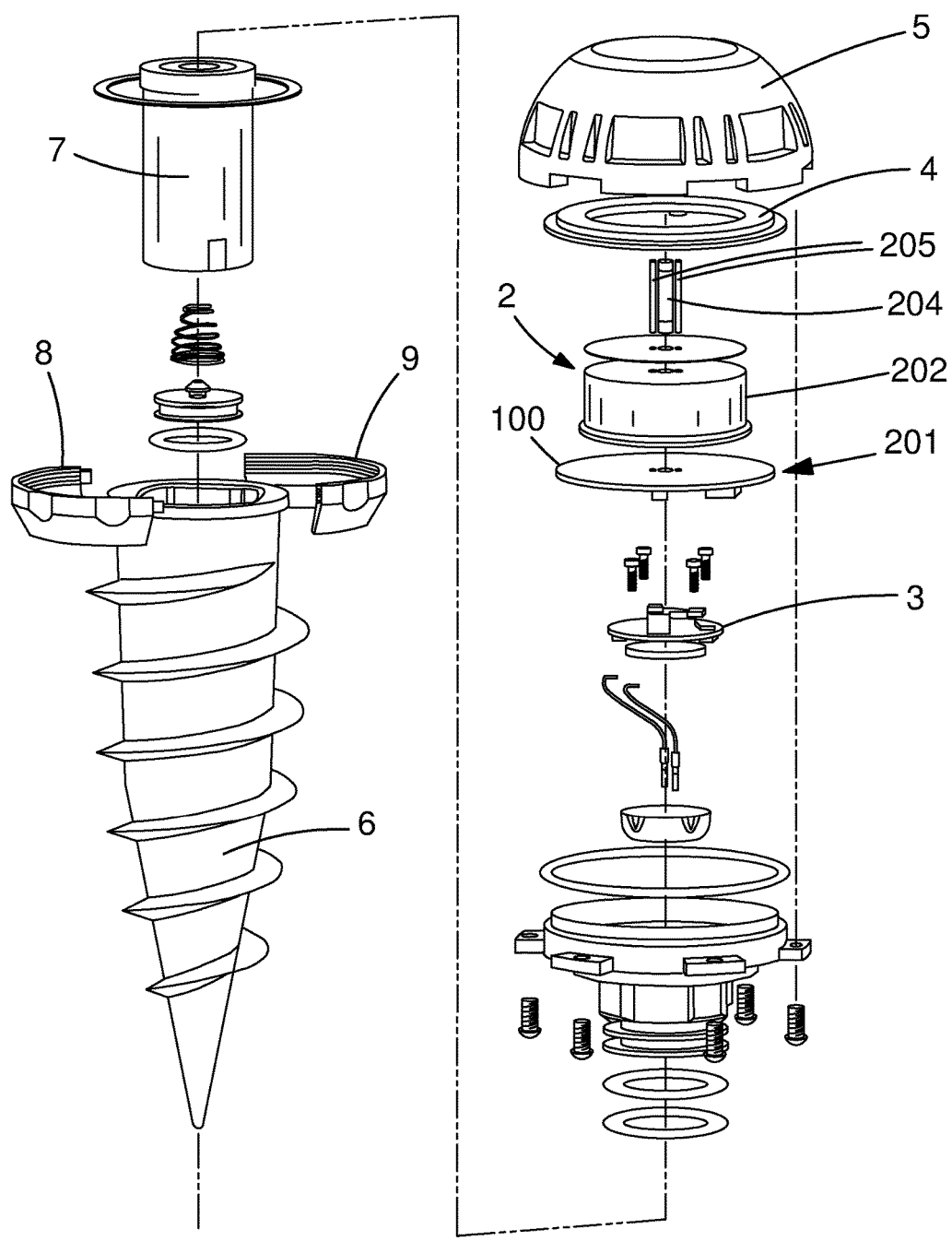
FIG. 3 is an exploded view of the unattended ground sensor unit shown in FIG. 1.
Figure 4A:
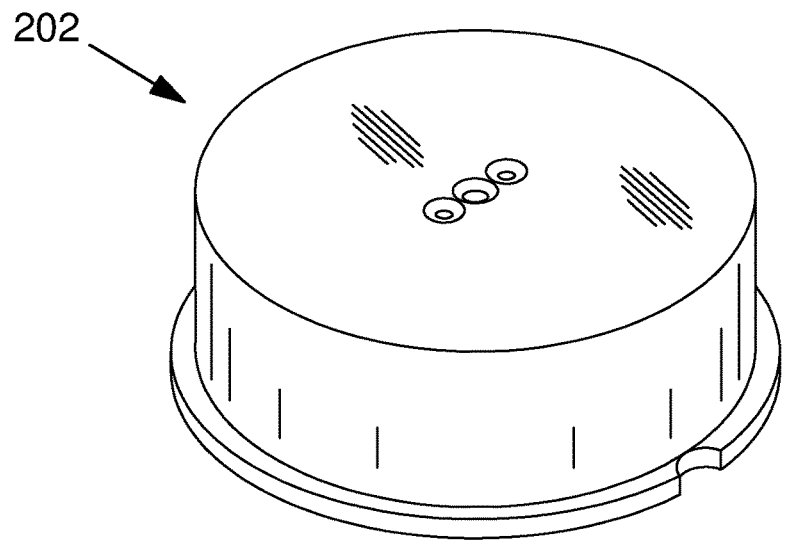
FIG. 4A is a perspective view of a solid dielectric component for use in an antenna in an embodiment of the invention.
Figure 4B:
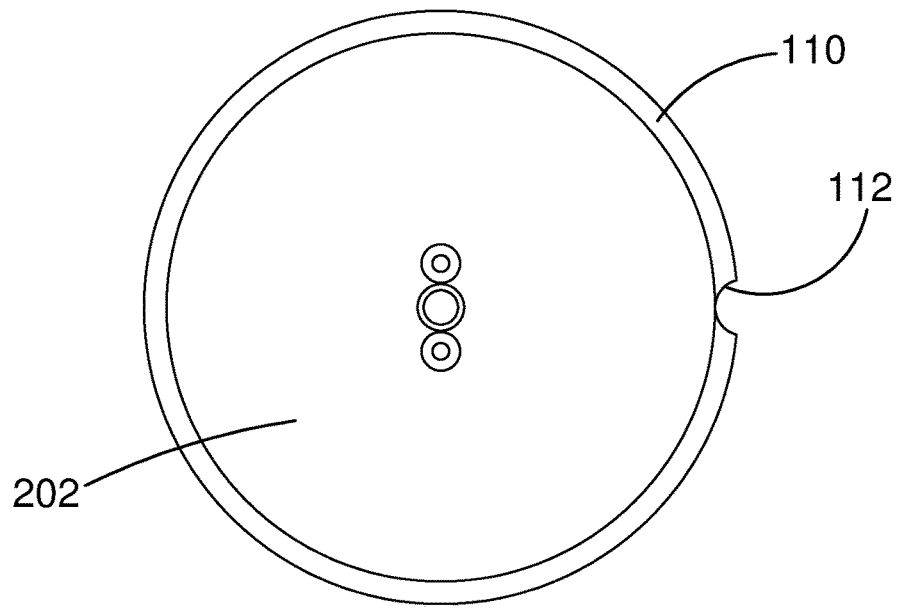
FIG. 4B is a top view of the solid dielectric component shown in FIG. 4A.
Figure 4C:
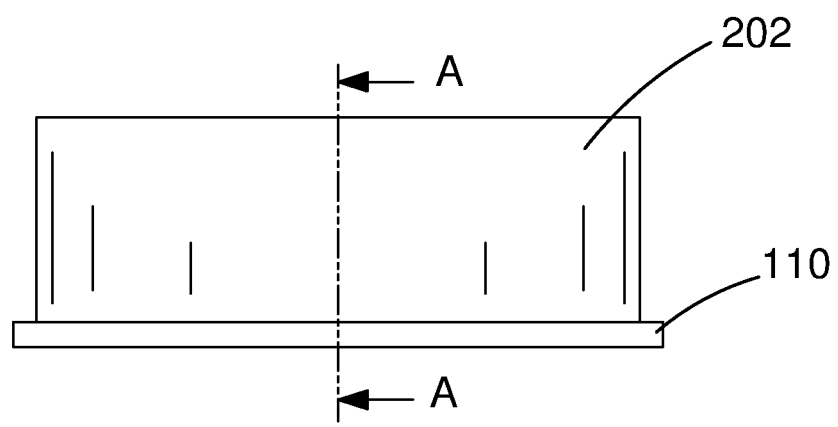
FIG. 4C is a side view of the solid dielectric component shown in FIG. 4A.
Figure 4D:
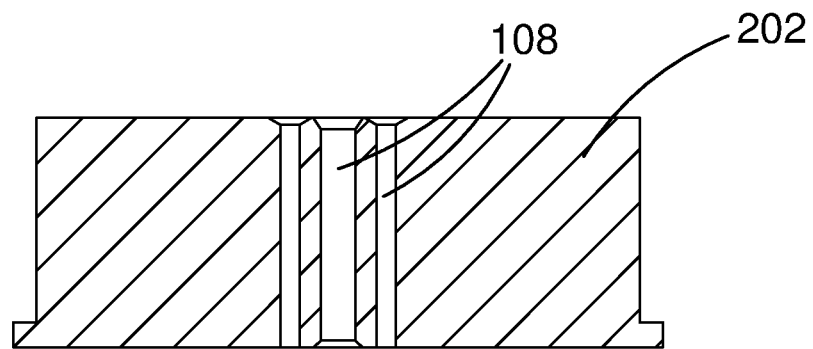
FIG. 4D is a section on line A-A of the solid dielectric component shown in FIG. 4C.
Figure 5A:
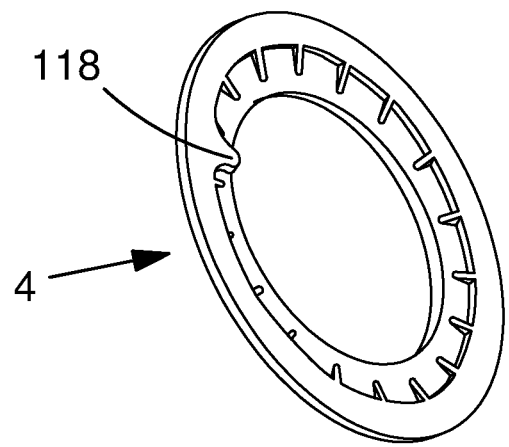
FIG. 5A is a perspective view of a retention ring for use in an antenna in an embodiment of the invention.
Figure 5B:
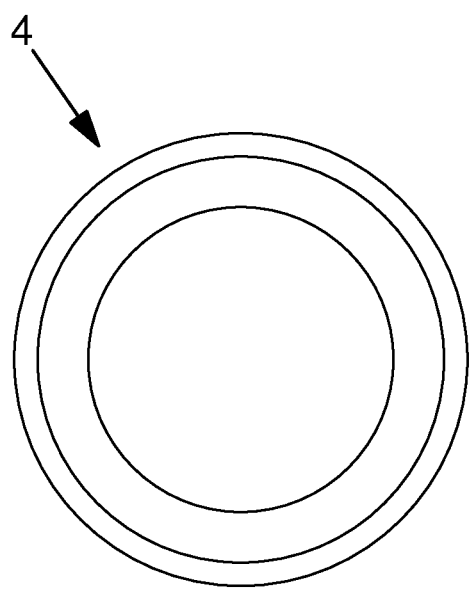
FIG. 5B is a top view of the retention ring shown in FIG. 5A.
Figure 5C:
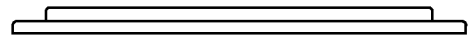
FIG. 5C is a side view of the retention ring shown in FIG. 5A.
Figure 5D:
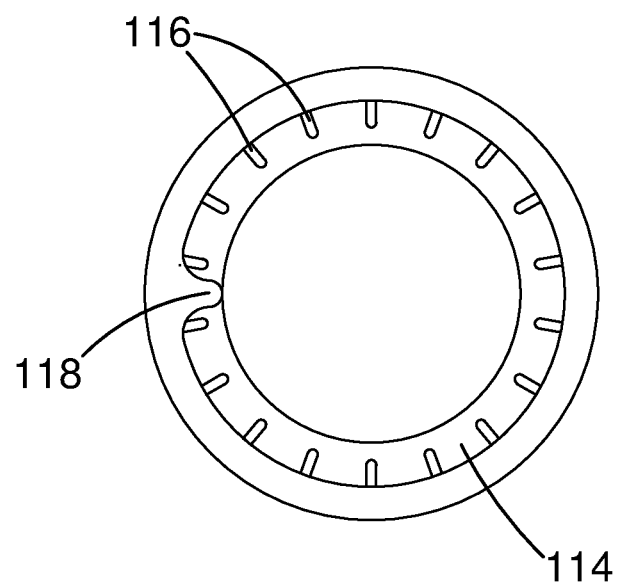
FIG. 5D is a bottom view of the retention ring shown in FIG. 5A.

FIGS. 1-3 show an unattended ground sensor unit 30 for use as part of a security or surveillance system. The unattended ground sensor unit comprises a body portion 6 and a head portion 5. The body portion 6 and head portion 5 together form a housing within which other components of the sensor unit are disposed. In the present embodiment a battery 7 for powering the sensor unit is located in a compartment within the body portion 6. Also provided within the ground sensor unit is a sensor 3, and an antenna 2. In the present embodiment the sensor 3 and antenna 2 are disposed in the head portion 2 of the unit. This means that the antenna 2 is arranged to be above ground level when the unit is installed in the ground. A screw thread is provided on and around an external surface of the body portion 6. Thus, if the sensor unit is rotated about the main axis whilst the sensor unit is inserted into the ground the thread will tend to draw the sensor unit into the surrounding ground at least up to a point where the head portion 2 comes in contact with the surface of the ground. Thus when installed, or deployed, the body portion 6 is located below ground level.

The head portion 2 is provided with engaging recesses 26 (see FIG. 1) to aid in the act of rotating the sensor unit around the main axis for insertion of the sensor unit into the ground. In some cases a deployment tool may be provided for engaging with these recesses to aid in insertion of the unit.

As is apparent from FIG. 3, the antenna 2 is accommodated mainly in the head portion 5 of the unit. The antenna includes a base conductor 100 that is attached to a first side of a printed circuit board 201. Antenna control circuitry is provided on a second side of the printed circuit board 201 and the sensor 3 is also connected to the printed circuit board. A retention ring 4 is provided to clamp the various components of the antenna 2 together. Locking rings 8, 9 are provided to clamp the head portion 5 and the body portion 6 together once all of the internal components have been assembled. In some arrangements a single locking ring may be provided.

Figure 6:
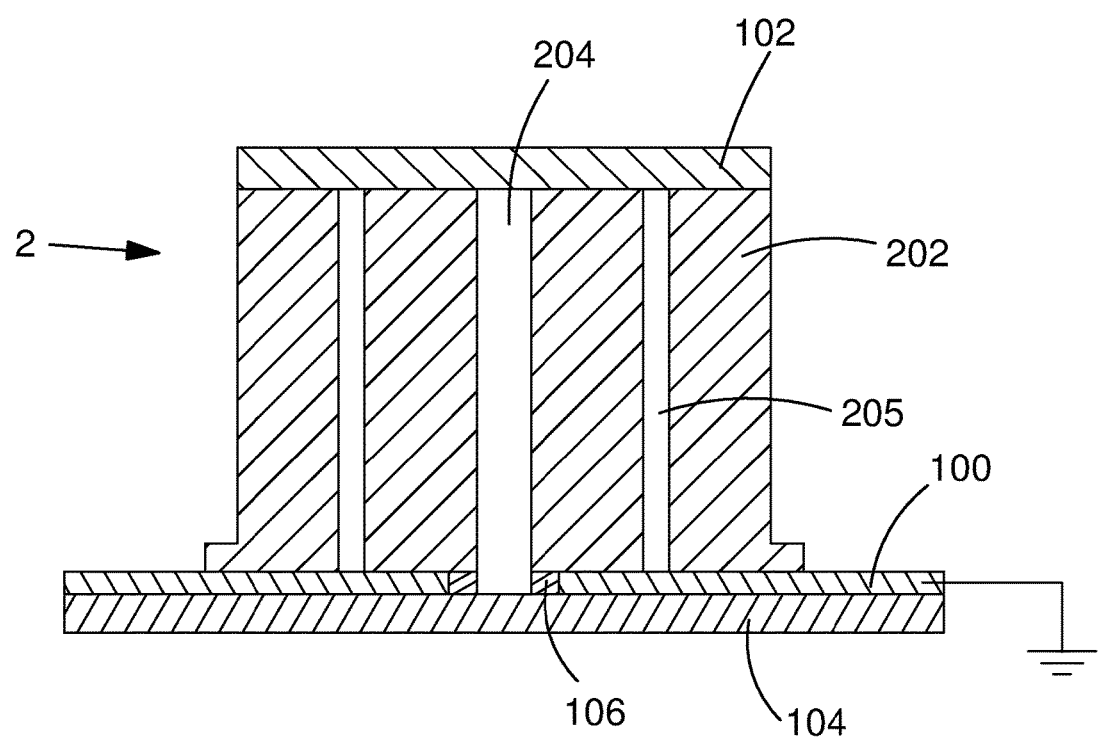
FIG. 6 is a cross-sectional view of an antenna for assembly in an unattended ground sensor, in an embodiment of the invention.

Further detail of the antenna 2 is apparent from FIG. 6. The antenna 2 comprises a base conductor 100 and a top conductor 102, both of which are circular plates, made of copper and arranged in a horizontal plane (with respect to the normal operating orientation of the unit). An antenna rod 204, made of brass, is electrically connected to the top conductor 102. A hole is provided in the base conductor 100 and the antenna rod 204 extends through the hole to be connected to antenna control circuitry on a printed circuit board 104 on the reverse side of the base conductor 100. An insulating ring 106 is provided around the antenna rod 204 where it extends through the base conductor 100 so that the antenna rod 204 is electrically insulated from the base conductor 100.

The base conductor 100 is connected to ground, and two shorting pins 205 are provided between the top conductor 102 and the base conductor 100. The shorting pins 205, made of copper, are provided on diametrically opposite sides of the antenna rod 204.

A dielectric spacer 202 is provided between the base conductor 100 and the top conductor 102. The dielectric spacer 202 includes bores to accommodate the antenna rod 204 and the shorting pins 205.

In operation, the antenna control circuitry is arranged to excite a current in the antenna rod 102, and this current flows to the top conductor 102. The shorting pins 205 carry the current to the base conductor 100, where the current is earthed. It has been determined by experiment that this arrangement provides an improved antenna efficiency for the application of an unattended ground sensor.

Further detail of the dielectric spacer 202 is shown in FIGS. 4A-D. The dielectric spacer 202 is generally cylindrical with bores 108 to accommodate the antenna rd 204 and the shorting pins 205. A flange 110 is provided at the bottom of the spacer 202, with respect to the normal operating orientation of the antenna 2, and the flange 110 includes a keying cut-out 112. The flange 110 and the keying cut-out 112 are intended to be engaged by the retention ring 4, further details of which are apparent from FIGS. 5A-D.

The retention ring 4 is designed to fit over the dielectric spacer 202, and the ring 4 includes a surface 114 with gripping teeth 116 for engaging the flange 110. A keying engagement 118 is also provided for engaging the cut-out 112 in the flange 110 and resisting any rotational movement of the spacer 202. When the retention ring 4 is fitted in place any vertical or rotational movement of the spacer 202 can be resisted preventing damage to the solder connections between the rod and the conductors and the shorting pins and the conductors.

The invention claimed is:

1. An antenna comprising:
    a first conductor having a first planar surface;
    a second conductor having a second planar surface, wherein the second planar surface is substantially parallel to the first planar surface;
    a conducting pin connected to the first conductor and extending between the first and second conductors;
    one or more shorting pins connected to the first conductor and extending between the first and second conductors, wherein the one or more shorting pins are electrically connected to both the first and second conductors;
    a solid dielectric spacer arranged in a space between the first and second planar surfaces, the solid dielectric spacer occupying a majority of a volume that exists between the first and second conductors and comprising a bore through which the conducting pin can extend, and at least one further bore for accommodating a respective one of the one or more shorting pins; and
    a clamp for engaging the solid dielectric spacer and holding it in place relative to at least one of the first conductor and second conductor, wherein the clamp comprises a retaining ring which acts on a periphery of the solid dielectric spacer and on one of the first conductor and second conductor for clamping the solid dielectric spacer to said one of the first conductor and second conductor and wherein the retaining ring comprises a keying feature and the solid dielectric spacer includes a keying feature that can be engaged with the keying feature of the retaining ring to resist rotation of the solid dielectric spacer relative to said one of the first conductor and second conductor.

2. The antenna of claim 1 wherein the solid dielectric comprises a flange that can be engaged by the clamp.

3. The antenna of claim 1 wherein the conducting pin is electrically connected to the first conductor and electrically insulated from the second conductor.

4. The antenna of claim 3 wherein the conducting pin extends through a bore in the second conductor, and an electrical insulator is provided between the second conductor and the conducting pin.

5. The antenna of claim 4 wherein there are at least two shorting pins, arranged on opposite sides of the conducting pin.

6. The antenna of claim 4 wherein the one or more shorting pins are made of a different material to the conducting pin.

7. An antenna according to claim 4 in which said insulator comprises an insulating ring provided around the conducting pin.

8. The antenna of claim 1 comprising an antenna controller electrically connected to the conducting pin so that electrical currents can be directed through the conducting pin to the first conductor.

9. The antenna of claim 8 wherein the antenna controller is provided on a circuit board and the circuit board attached to the opposite side of the second conductor to the first conductor.

10. The antenna of claim 1 wherein the second conductor is arranged at a fixed electrical potential.

11. The antenna of claim 1 wherein the frequency of operation is in the range of 800-1000 MHz.

12. An unattended ground sensor comprising a housing for accommodating the antenna of claim 1.

13. The unattended ground sensor of claim 12 further comprising at least one sensor for sensing a physical phenomenon in the region of the unit, wherein the antenna is arranged to transmit information regarding the sensed physical phenomenon.

14. An unattended ground sensor according to claim 12 in which the clamp locks the solid dielectric spacer to the housing of the unattended ground sensor.

15. An unattended ground sensor according to claim 12 which comprises a head portion housing the antenna and a body portion for insertion in the ground and at least one locking ring for clamping the head portion to the body portion.

16. An antenna according to claim 1 in which the solid dielectric spacer comprises a flange and the retaining ring comprises gripping teeth for engaging the flange of the solid dielectric spacer.

17. An antenna according to claim 1 in which the clamp is arranged to resist movement of the solid dielectric in a direction which is substantially perpendicular to the first and second planar surfaces as well as the clamp being arranged to resist movement of the solid dielectric in a direction which is substantially parallel to the first and second planar surfaces.

18. An antenna according to claim 1 in which the solid dielectric is arranged to resist mechanical forces that could otherwise bend or warp one or both of the first and second planar surfaces.

19. An antenna according to claim 1 in which the solid dielectric spacer is generally cylindrical.

* * * * *